3,265,331
SUPERSONIC INLET
Alfred Miles, Burnt Hills, N.Y., assignor to General
Electric Company, a corporation of New York
Filed Sept. 18, 1964, Ser. No. 397,386
6 Claims. (Cl. 244—53)

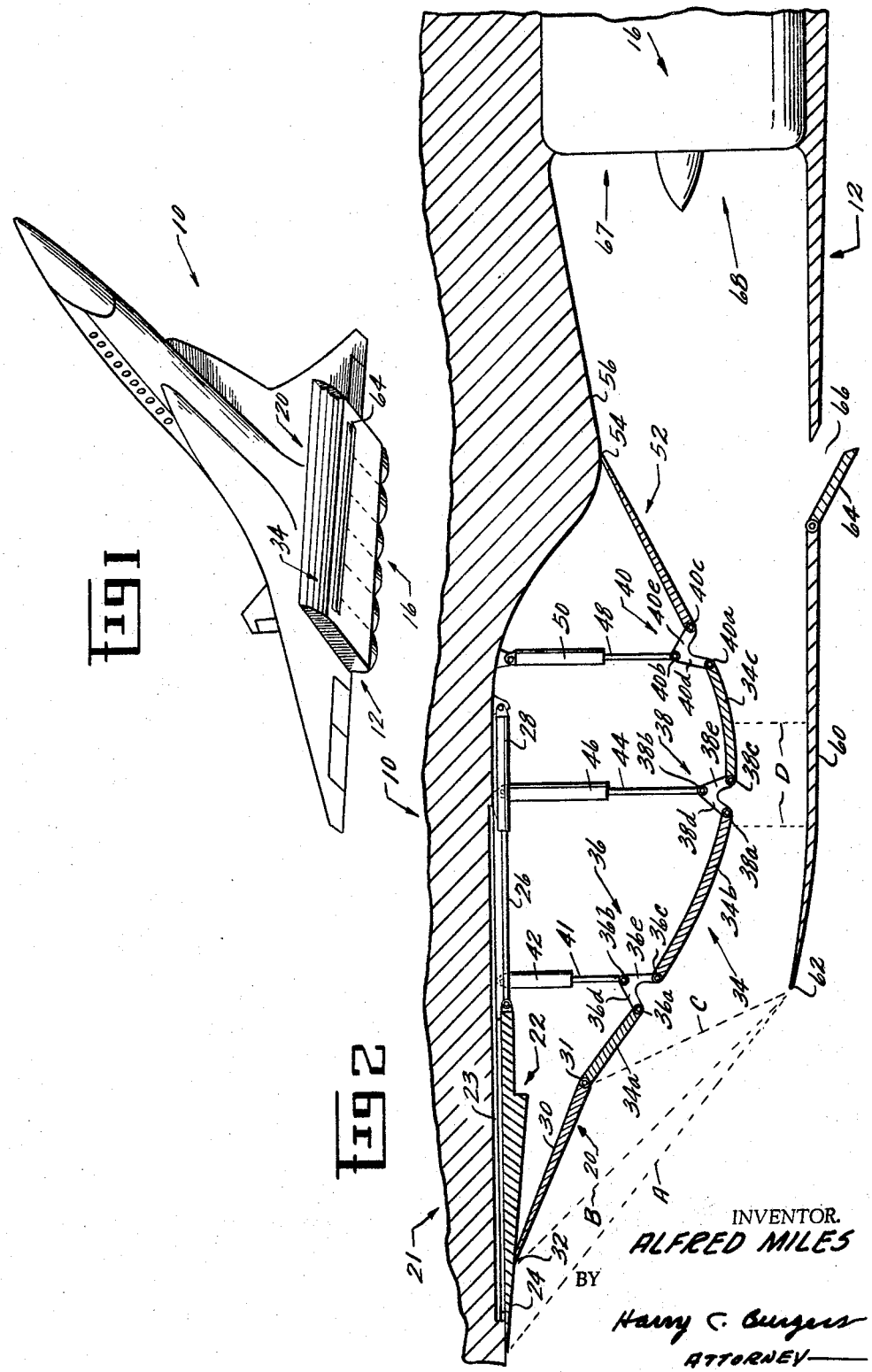

This invention relates to supersonic inlets for high speed aircraft, and more particularly, to an air inlet or intake of the two-dimensional flow type having variable geometry wherein there is provided an improved means for matching the air requirements of the engine to that supplied by the inlet.

In the case of turbojet type engines, in particular those for use in high speed (e.g., Mach 3.5 to 4.0 and above) supersonic aircraft, the air inlet configuration presents difficulties for the designer primarily in the area of flow matching. That is, the more rigid airflow schedule or demand compared to that of a ramjet, for example, of the typical multistage, axial-flow, variable speed compressor dictates a particular compressor (engine) inlet mass airflow at a given operating condition. The mass of air handled by the engine, on the other hand, is a direct function of the pressure recovery, pressure recovery being the ratio of the total (velocity) energy in a moving supersonic air stream captured by an inlet system to the pressure (static) energy of airflow in the diffuser (subsonic) portion of the inlet. This is so because in a turbojet engine the volume of air ingested during a given period of time can be considered constant for a constant engine r.p.m. Thus, a change in pressure, which results in a change in density (at constant temperature), can have considerable effect on engine performance by reason of the resultant change—increase or decrease—in mass flow, since engine thrust is generally a function of engine mass flow. The rise in inlet static pressure, which concomitantly increases available net thrust, theoretically has a maximum for a given Mach number of the supersonic air stream. In actual practice pressure recovery never achieves the theoretical maximum, and inlet-engine flow matching must take into consideration such factors as problems due to velocity discontinuities (compressor inlet total pressure distortion), flow unsteadiness or "buzz," diffusion and friction losses.

Accordingly, the inlet designer must, in attempting to achieve optimum air handling capability of the engine, keep in mind the nature of the "shock waves" or discontinuities in air velocity, pressure, density and temperature, which accompany the energy losses. In almost all cases, an inlet operating at supersonic flight speeds is accompanied by a "normal" shock wave, i.e., one perpendicular to the main flow direction. Flow just upstream of a normal shock wave is supersonic and just downstream, subsonic. Where the normal shock wave is right at the throat or minimum area of the diffuser, so that all subsonic flow is in the inlet diffuser portion, the inlet is performing at maximum air handling capacity and operation is said to be "critical." If, on the other hand, the normal shock is located aft of the throat or is swallowed by the diffuser, it is possible to have "supercritical" operation to such an extent that flow velocities are even higher in the inlet than in the free stream, with a concomitant reduction in pressure recovery. Conversely, in "subcritical" operation, the normal shock is regurgitated, i.e., the inlet attempts to deliver more air than is required by the engine—a condition of high "inlet drag" due to the flow spillage losses behind the normal shock wave standing outside the inlet. Where the inlet airflow supply would exceed engine demand a determination has to be made by the designer either to accept the spillage loss or, more conventionally, provide means to vary the inlet flow handling capabilities, depending on the flight regime, such as by ingesting the excess air and bypassing it around the engine, through auxiliary exhaust ducts, for example.

As is also well known, in decelerating the air to subsonic speeds to permit ingestion by the compressor, it is desirable to precede the normal shock by one or more plane oblique shock waves, i.e., flow discontinuities turning sharply into axial or horizontal flow line. This will accomplish higher total pressure recovery by reason of a gradual reduction in flow Mach number, as opposed to the sudden change to subsonic across the normal wave. For example, it can be shown that for a practical two-dimensional flow inlet system, two oblique shocks for Mach numbers from about 1.8 to 3.0 and three such shocks for speeds above Mach 3.0 may be required for optimum pressure recovery. In any case, location of the shock waves will be dependent on the type of inlet utilized. The known types generally comprise three, namely, (1) all external compression, wherein the oblique shocks are ahead of the inlet cowl or lip (e.g., a conical or axisymmetric three-dimensional flow system), (2) all internal compression, wherein at least one oblique shock is downstream of the lip (e.g., in a two-dimensional, rectangular inlet), and (3) internal-external oblique shock compression. The latter design can provide lower drag oblique shock spillage, relatively higher pressure recovery and generally better overall performance. Furthermore, in the case of a two-dimensional type, an inlet of greater flexibility can be provided.

To explain further, the majority of supersonic aircraft in current use and projected for future are, and will be, mixed mission aircraft, i.e., a significant portion of flight time is spent at subsonic speeds. Even where the vehicle will cruise at supersonic speeds, however, under take-off and loiter (landing pattern) conditions the inlet optimum size will differ from that at cruise. For example, an inlet designed to match engine requirements at high speed cruise could be oversize for other speed and altitude conditions. This, in turn, would cause the inlet to sustain associated large drag penalties under mismatched inlet-engine airflow conditions by reason of losses due to spillage of excess flow externally of the inlet, or through the means utilized for by-passing excess air ingested by the inlet. Previous work had indicated that relatively higher drag (spillage) losses can be associated with *external* compression type inlets, compared to the drag (bypass system) losses of *internal* compression type inlets, at flight speeds of Mach 2.0 and above. The results of these studies, however, are deemed correct only when viewed from the standpoint of the limiting geometric assumptions made in light of the inlet designs which were foreseen as being capable of practical use. More recent studies, on the other hand, have indicated potential performance gains are to be secured from spilling air externally—instead of bypassing internally—over a wide range of the supersonic flight spectrum, *provided* there is proper integration of all inlet components.

Previous oblique shock spillage systems have included conical (axisymmetrical) type inlets with translating spike centerbodies or ramps providing an external compression inlet, e.g., as shown in the United States patent to Salter, 2,638,738. Similar is the "cowl" type of McLafferty, 2,938,334 and the variable ramp two-dimensional inlet typified in Griffith, 2,840,322. Internal bypass was also introduced and accepted as a convenient method for matching airflow in the Mach 1.5 to 3.0 flight range because it seemingly avoided the complicated geometric variations associated with ramp or spike translatory movement. Even more recently there has been a trend away from these internal bypass matching systems and inlets having translating spikes and utilizing external-internal compression by means of multiple oblique shock spillage as the main airflow matching system, have again been favored. While these previous designs have merit all have certain inherent deficiencies, e.g., the two-dimensional systems can have more flexibility and the axisymmetric external system can be more efficient.

Accordingly, the primary object of the present invention is to capitalize on the relatively low momentum loss (drag) realized across the first oblique shock of an external multiple shock system generated by external compression surfaces while retaining the geometric flexibility of a two-dimensional type inlet.

A more specific object of the present invention is to provide a variable geometry, external-internal compression, two-dimensional ariflow type inlet having optimum airflow pressure recovery and improved operation, particularly with respect to inlet-engine airflow matching.

Briefly stated, in the disclosed embodiment of my invention, I provide a supersonic, variable geometry, two-dimensional flow inlet comprising a translating forward member having a fixed (or variable) angle ramp, a "floating" ramp adapted to ride at its forward edge on the fixed ramp and a scheduled segmented variable-angle external-internal compression ramp. The latter includes a front variable section, an intermediate variable section and a rear variable (internal) section. The three sections or segments of the variable angle ramp are interconnected by a series of movable hinge-points and suitable linkage means. Fixed hinge-points are also provided to connect the forward edge of the front scheduled ramp segment to the rearward edge of the floating ramp and the rearward edge of the rear ramp segment to a subsonic (diffuser) floating internal ramp, the latter being in silding contact at its rearward or downstream edge with the inlet pod (or air frame) supporting structure at a sliding surface thereon. Spaced vertically from the forward floating ramp and the segmented variable angle ramp and extending transversely of the two-dimensional inlet is an outer cowl member forming the lower surface or boundary wall of the inlet. Suitable actuation means are provided to move the variable components of the inlet to achieve improved inlet-engine airflow matching capability, as well as pressure recovery over a wide range of engine operating conditions and Mach numbers, as hereinafter described in detail.

The features of the invention desired to be protected are set forth with particularity in the appended claims. The invention together with further objects and attendant advantages thereof may perhaps be bettter understood, however, by reference to the following specification when taken in connection with the accompanying drawings, in which:

FIG. 1 is a pictorial representation of an aircraft capable of supersonic flight and utilizing the improved air inlet design of the invention for supplying air to one, or more, jet engines; and FIG. 2 is an enlarged partial cross-sectional view of my improved two-dimensional airflow inlet design featuring improved inlet-engine airflow matching capability.

As stated previously, the primary object of the invention is to take advantage of the relatively low drag losses across the first oblique shock of a multiple shock system generated by an external compression surface while, at the same time, retaining the geometric flexibility of the two-dimensional flow type inlet. As shown in FIG. 1, the inlet may be located on the under side of a supersonic aircraft, indicated generally at 10. The installation may comprise a pod, indicated generally at 12, mounted below the wings of the aircraft adjacent the rear portion of the fuselage thereof and one or more engines, indicated generally at 16 (by dotted lines), located in the pod and arranged to eject exhaust gases out the rear end thereof to provide the necessary thrust for propelling the vehicle. At the front of the pod and indicated generally at 20 in FIG. 1 is the inlet structure of the invention.

Turning now to FIG. 2 and a more specific description of the components of my improved, variable geometry, two-dimensional airflow inlet, the upper wall of the supporting airframe structure or pod is indicated generally at 21. Located forwardly of the pod and just inside the front edge is a forward translatable slide plate indicated generally at 22. At its upper surface the slide plate is retained on a track 23 affixed to the under surface of the air frame structure or pod wall. The side plate includes an integral fixed angle ramp portion 24. Although shown in FIG. 2 as being fixed, the forward ramp portion 24 of translatable slide plate 22 may comprise a limited variable angle ramp by modifying the slide plate through provision of a hinge at the apex or forward point of the slide plate which would be affixed to the air frame structure so as to separate the surface of ramp 24 from the slide plate. An actuator and link could then be provided to move the ramp or it could be pressure actuated. In any event, translatory movement of the slide plate 22 and ramp 24 on the track 23 is provided by means of an actuator rod 26 operated by a motor means 28 receiving a signal from a suitable inlet control system (not shown), or manually from the aircraft pilot. Rearwardly or downstream of the translatable slide plate 22 is situated ramp 30, a primary feature of the inlet design. This forward located surface, which I have chosen to call a floating ramp, is adapted to slide along the surface of the fixed (or movable) ramp 24 on its forward edge 32 which rests on and is restrained by ramp 24 by suitable conventional means, such as a groove and roller arrangement (not shown). The downstream rearward edge of floating ramp 30 is secured by fixed hinge-point 31 to the forward edge of a variable ramp segment 34a, which is part of a segmented or sectioned scheduled variable angle external-internal compression ramp, indicated generally at 34. The external-internal compression ramp 34 comprises, in addition to the aforementioned forward section 34a, an intermediate variable ramp section or segment 34b and a rearward (internal) ramp section or segment 34c. The segments of the variable external-internal ramp 34 are secured one to the other by a plurality of movable hinge and linkage members indicated generally at 36, 38 and 40. The movable hinge-linkage point 36 comprises pivot points 36a 36b and 36c connected by short link members 36d and 36e. Attached at point 36b is an actuator rod 41 operated by suitable motor means, indicated at 42, in response to a control parameter supplied by the inlet control system, or by the pilot, manually. Likewise, movable hinge-linkage means 38 and 40 comprise, respectively, pivot points 38a, 38b and 38c and links 38d and 38e operated by an actuator rod 44 connected to motor means 46, and pivot points 40a, 40b, 40c connected by links 40d, 40e and operated by an actuator rod 48 connected to motor means 50. Again, motor means 46 and 50 are operated by a suitable inlet control system parameter. Also attached at movable pivot point 40c is a rear or subsonic internal floating ramp portion, indicated generally at 52, having an after edge 54 slidably restrained on a rear ramp sliding surface 56 on the inner wall of the air frame structure or pod upper wall.

Spaced vertically from the variable geometry portions of the two-dimensional flow inlet of FIGS. 1 and 2 and comprising a portion of the under wall of the pod is an outer cowl member 60 having a forwardly located lip at 62. In the cowl portion 60 of the inlet pod there may be provided an internal bypass door, such as indicated at 64 operated by motor means (not shown) suitably tied into the inlet control system, for by-passing excess airflow through an opening 66, for matching the inlet-engine airflow requirements. One of the jet engines 16 is rearwardly located in the inlet diffuser portion, indicated generally at 68.

Operation of my improved variable geometry, two-dimensional flow inlet will now be described. With respect to airflow pressure recovery, the angle of the forward variable internal-external ramp section 34a will preferably be scheduled by the inlet control system as a function of the Mach number behind the second oblique shock B. This will maintain the third oblique shock C close to the cowl tip 62 and also provide the necessary inlet contraction ratio (ratio of the throat area D—or critical area to engine inlet flow area) for efficient pressure recovery operation. The intermediate and rearward variable ramp segments 34b and 34c, respectively, and the floating rearward (subsonic) variable ramp 52, coupled through the movable hinge-link system, operate to provide a scheduled inlet contraction ratio as a function of the position of the forward scheduled variable ramp segment 34a.

As stated previously, a prime requirement is to match the engine requirements to the airflow provided by the inlet system, and vice-versa. This requirement, however, is not necessarily associated with the problem of optimizing pressure recovery by means of scheduling the variable inlet geometry. Rather, it is a problem of obtaining the best matching, once the desired internal inlet contraction ratio, for example, has been provided by movement of the variable inlet components. Thus, the "unscheduled" problem of proper engine-inlet airflow matching (which, nevertheless, will ultimately have a significant effect on pressure recovery obtainable must be solved by either external flow spillage or internal flow dumping, i.e. by-passing around the engine. Therefore, in accordance with a primary feature of my invention the inlet depicted herein is operable to obtain improved inlet-engine airflow matching generally as follows. The translatable slide plate 22 is moved fore and aft on track 23 to change the relative position of the first oblique shock A with respect to the cowl tip 62. This relative oblique shock movement causes an increase or decrease, depending on the direction of movement of the translating slide plate member, in the oblique shock system's mass flow spillage rate. Translation of the slide plate in the described environment, however, does *not* change or affect the internal contraction ratio of the inlet directly. The angle of the forward floating ramp section 30, in other words, is changed slightly due to its cooperation with the translatable slide plate member 22 which changes both the Mach number behind the second oblique shock B and the reference angle of the forward scheduled ramp segment 34a. These changes, in turn, are resolved by the control and movable linkage system into a repositioning of the forward ramp (external) segment 34a and the intermediate and rearward variable ramp segments 34b and 34c (internal), respectively, as well as the position of the subsonic floating ramp portion 52. It should be noted, however, that the relative positions of the second and third oblique shocks in such case will, for all practical purposes, be unchanged. The floating external ramp member 30 therefore in cooperation with the translating slide plate 22 and the variable external-internal segmented ramp member 34 enables excess airflow to be spilled from the inlet through a relatively low drag oblique shock system instead of an internal high loss by-pass or dump system. Moreover, this desirable result is accomplished in a two-dimensional airflow system having improved geometry flexibility over conventional supersonic inlet designs, particularly those of the axisymmetric type, by reason of the fact that the ramp 22 may be translated fore or aft for inlet flow adjustment without inducing undesirable changes in variable ramp angles which would be effective to cause an unwanted decrease in the pressure recovery obtainable at that point in the flight regime, as dictated by the scheduled overall inlet configuration.

In summary, with the hereindescribed invention the inlet mass flow spillage rate is changed without inducing unwanted physical variations in the *external* shock system or in the inlet (internal) contraction ratio. This results in an improvement in the overall controllability of the inlet with respect to avoiding "buzz" or inlet instability, as well as improving efficiency for even greater performance. Additionally, the forward floating ramp 30 being variable in angle can also be utilized in improving the pressure recovery performance of the inlet over a wide range of supersonic operational speeds. Finally, the internal bypass system, if required for maintenance of the normal shock at the throat, can be designed with significantly smaller airflow variations by reason of the improved variable geometry arrangement of the inlet design of this invention.

While I have shown and described a particular embodiment of my invention it will be obvious to those skilled in the art that various changes and modifications may be made without departing from the invention in its broader aspects. Therefore, the appended claims are intended to cover all such changes and modifications that fall within the scope of the spirit of the invention.

What is claimed as new and desired to be secured in the United States Patent Office is:

1. A supersonic, two-dimensional, combination external-internal compression air inlet system having a longitudinal axis and comprising:

a first surface angled with respect to said axis and generating an initial oblique shock wave externally of the inlet, said first surface being selectively translatable fore and aft longitudinally of said inlet system;

a forward floating surface generating at least one secondary oblique shock wave externally of the inlet, the angle of said forward floating surface with respect to said axis being determined as a function of the longitudinal position of said first angled surface;

a segmented, variable angle ramp providing internal compression in said inlet, said ramp including a forward portion pivotally connected to said floating surface and variable in angle with respect to said axis and said floating surface, said ramp portion adjusting to angle changes of said floating surface whereby said contraction ratio is substantially unaffected during translation of said first angled surface to vary the oblique shock mass flow spillage rate so as to decrease aerodynamic drag, the angle of said forward floating surface automatically decreasing at high mass flow spillage rates and automatically increasing at low mass flow spillage rates so as to improve overall inlet pressure recovery.

2. In a two-dimensional flow air inlet for supersonic jet aircraft, improved means for changing the oblique shock mass flow spillage rate for optimum inlet-jet engine flow matching without adversely affecting the inlet contraction ratio for a given operating condition, said means comprising:

a cowl member forming a lower boundary wall for the inlet, said cowl having a forward lip portion;

a first shock wave generating transverse ramp means slidable fore and aft along the inlet longitudinal axis for positioning an initial oblique shock wave with respect to said forward lip portion;

a floating shock wave generating transverse ramp member pivotally supported at its rearward edge at a hinge-point fixed in said inlet, said floating ramp member being slidably retained at its forward edge on said first transverse ramp means;

a segmented variable angle ramp member located rearwardly of said floating ramp, said segmented ramp member being attached at its forward edge to said fixed hinge-point and being adjustable to change the inlet contraction ratio, wherein the angle of said floating ramp member with respect to said inlet axis changes with movement of said first ramp means for automatic adjustment of the Mach numbers behind said secondary oblique shock waves, the relative position of said secondary oblique shock waves each with respect to the other and the inlet contraction ratio being substantially unchanged.

3. The apparatus as described in claim 2 wherein said cowl member includes a port located in a subsonic diffuser portion of said inlet and door means for said port, said door means being operable in cooperation with sliding movement of said first shock wave generating ramp means to open said port to by-pass air entering said inlet around said jet engine.

4. In a supersonic, two-dimensional, combination external-internal compression jet engine inlet system:

means generating an initial oblique shock wave externally of said inlet including a first member having a forward ramp surface thereon angled with respect to the inlet longitudinal axis;

support means fixed in said inlet including a track, said first member being slidably mounted on said track for translating movement fore and aft of said inlet parallel to said axis;

second means generating at least one secondary oblique shock wave externally of said inlet including a floating forward ramp member pivotally supported at its rear edge at a hinge-point fixed with respect to said support means, the forward edge of said forward floating ramp member riding on said forward ramp surface; and third ramp means, said third ramp means being movable for scheduling of the inlet internal contraction ratio, wherein said fore and aft translation of said first member changes the inlet system's main flow spillage rate for improved inlet-engine airflow matching without substantially affecting the inlet contraction ratio so as to maintain maximum inlet pressure recovery achieved by the scheduling of said third ramp means.

5. The apparatus as described in claim 4 wherein said forward ramp surface of said first member is pivotally supported from said first member at the forward edge of said ramp surface to permit relative angular movement of said surface with respect to said member.

6. The apparatus as described in claim 4 wherein said third ramp means includes first, intermediate and rear ramp segments and a rearward floating ramp member, said segments being movably supported one with respect to the other by pluralities of hinged members pivotally linking the adjacent edges of said segments, said rearward floating ramp member being pivotally supported at its forward edge from said rear segment, the rear edge of said floating ramp member being in sliding contact with a fixed surface in the subsonic diffuser portion of said inlet.

References Cited by the Examiner

UNITED STATES PATENTS

| | | | |
|---|---|---|---|
| 2,934,893 | 5/1960 | Streeter | 60—35.6 |
| 3,067,573 | 12/1962 | Connors | 60—35.6 |

FERGUS S. MIDDLETON, *Primary Examiner.*

MILTON BUCHLER, *Examiner.*

L. C. HALL, *Assistant Examiner.*